United States Patent
Ogawa et al.

(10) Patent No.: US 9,698,441 B2
(45) Date of Patent: *Jul. 4, 2017

(54) FUEL CELL MODULE

(71) Applicant: HONDA MOTOR CO., LTD., Tokyo (JP)

(72) Inventors: Tetsuya Ogawa, Wako (JP); Yuki Yoshimine, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/905,304

(22) PCT Filed: Jul. 10, 2014

(86) PCT No.: PCT/JP2014/068968
§ 371 (c)(1),
(2) Date: Jan. 15, 2016

(87) PCT Pub. No.: WO2015/008806
PCT Pub. Date: Jan. 22, 2015

(65) Prior Publication Data
US 2016/0172698 A1    Jun. 16, 2016

(30) Foreign Application Priority Data

Jul. 19, 2013    (JP) ................. 2013-150804

(51) Int. Cl.
*H01M 2/00* (2006.01)
*H01M 8/0612* (2016.01)
(Continued)

(52) U.S. Cl.
CPC ........... *H01M 8/0631* (2013.01); *B01J 8/065* (2013.01); *B01J 8/067* (2013.01); *C01B 3/34* (2013.01);
(Continued)

(58) Field of Classification Search
CPC .............. B01J 8/068; B01J 2208/00194; B01J 2208/00212; H01M 8/04126;
(Continued)

(56) References Cited

U.S. PATENT DOCUMENTS

2006/0251939 A1* 11/2006 Bandhauer ........ H01M 8/04014
429/435
2009/0104486 A1   4/2009 Kanao
2011/0113688 A1   5/2011 Kuwaba et al.

FOREIGN PATENT DOCUMENTS

JP   2001-201019   7/2001
JP   2004-319330   11/2004
(Continued)

OTHER PUBLICATIONS

International Search Report dated Oct. 21, 2014, Application No. PCT/JP2014/068968.

*Primary Examiner* — Mark F Huff
*Assistant Examiner* — Monique Wills
(74) *Attorney, Agent, or Firm* — Rankin, Hill & Clark LLP

(57) ABSTRACT

A fuel cell module includes a fuel cell stack and FC peripheral equipment. The FC peripheral equipment includes an evaporator. At least one of evaporation pipes of the evaporator connects a water vapor discharge chamber and an inlet of a reformer to form an evaporation return pipe as a passage of water vapor. A raw fuel pipe is inserted into the evaporation return pipe for allowing a raw fuel to flow from the downstream side to the upstream side of the evaporation return pipe.

8 Claims, 13 Drawing Sheets

(51) Int. Cl.
  *H01M 8/04014* (2016.01)
  *H01M 8/04007* (2016.01)
  *C01B 3/34* (2006.01)
  *B01J 8/06* (2006.01)
  *H01M 8/04119* (2016.01)
  *H01M 8/124* (2016.01)

(52) U.S. Cl.
  CPC ... *H01M 8/04022* (2013.01); *H01M 8/04074* (2013.01); *H01M 8/04126* (2013.01); *B01J 2208/0053* (2013.01); *B01J 2208/00194* (2013.01); *B01J 2208/00212* (2013.01); *B01J 2208/00221* (2013.01); *B01J 2208/00716* (2013.01); *B01J 2208/00902* (2013.01); *C01B 2203/0233* (2013.01); *C01B 2203/066* (2013.01); *C01B 2203/0811* (2013.01); *C01B 2203/1205* (2013.01); *C01B 2203/1241* (2013.01); *C01B 2203/1258* (2013.01); *C01B 2203/1294* (2013.01); *C01B 2203/141* (2013.01); *C01B 2203/16* (2013.01); *C01B 2203/1604* (2013.01); *C01B 2203/1619* (2013.01); *H01M 2008/1293* (2013.01)

(58) Field of Classification Search
  CPC .......... H01M 8/0631; H01M 8/04022; H01M 8/04074; H01M 2008/1293; C01B 3/34; C01B 2203/0811
  See application file for complete search history.

(56) References Cited

FOREIGN PATENT DOCUMENTS

| | | |
|---|---|---|
| JP | 2010-157498 | 7/2010 |
| JP | 2011-207726 | 10/2011 |
| JP | 2012-057927 | 3/2012 |

* cited by examiner

FUEL CELL MODULE

TECHNICAL FIELD

The present invention relates to a fuel cell module including a fuel cell stack formed by stacking a plurality of fuel cells for generating electricity by electrochemical reactions of a fuel gas and an oxygen-containing gas.

BACKGROUND ART

Typically, a solid oxide fuel cell (SOFC) employs a solid electrolyte of ion-conductive oxide such as stabilized zirconia. The solid electrolyte is interposed between an anode and a cathode to form an electrolyte electrode assembly (MEA). The electrolyte electrode assembly is interposed between separators (bipolar plates). In use, normally, predetermined numbers of the electrolyte electrode assemblies and the separators are stacked together to form a fuel cell stack.

The fuel cell stack and peripheral equipment (BOP) including components such as a reformer, an evaporator, a heat exchanger, and an exhaust gas combustor are used in combination to form a fuel cell module. In the structure, the reformer reforms a mixed gas, for example, of a raw fuel chiefly containing hydrocarbon and water vapor to produce the fuel gas supplied to the fuel cell stack. Therefore, it is desirable to efficiently mix two fluids, i.e., the raw fuel and the water vapor, that are supplied separately.

For example, in a combustion apparatus for a fuel cell system disclosed in Japanese Laid-Open Patent Publication No. 2001-201019 (hereinafter referred to as the conventional technique 1), as shown in FIG. 11, a high calorie combustion gas supply pipe 3a is provided for supplying hydrocarbon fuel to a flame hole 2a of a combustor 1a. The high calorie combustion gas supply pipe 3a and a high calorie combustion gas supply pipe 4a for supplying a reactant gas that has been supplied to the fuel cell system, but not consumed in the fuel cell system (off gas), to the combustor 1a jointly form a dual pipe 5a. A plurality of holes 6a are formed at a downstream end of the high calorie combustion gas supply pipe 4a. After the off gas flows through the high calorie combustion gas supply pipe 4a, the off gas flows through the holes 6a and is supplied to the flame hole 2a.

Further, in a kerosene fuel vaporizing method for a fuel cell disclosed in Japanese Laid-Open Patent Publication No. 2004-319330 (hereinafter referred to as the conventional technique 2), as shown in FIG. 12, a vaporizer 1b is used. The vaporizer 1b includes a water vapor inlet pipe 2b and a kerosene oil inlet pipe 3b. An injection port 5b is formed at a front end of the kerosene oil inlet pipe 3b through a tapered portion 4b. A mixing/vaporizing portion 6b is formed on the front side of the injection port 5b.

The injection port 5b injects the kerosene oil fuel toward the mixing/vaporizing portion 6b, and at the mixing/vaporizing portion 6b, the kerosene oil fuel and the water vapor supplied from the water vapor inlet pipe 2b are mixed with each other to vaporize the kerosene oil fuel.

Further, in an injection device for injecting a mixed fuel disclosed in Japanese Laid-Open Patent Publication No. 2012-057927 (hereinafter referred to as the conventional technique 3), as shown in FIG. 13, a mixed fuel injection nozzle body 1c, a combustion chamber 2c, a spray guidance pipe 3c, and a mixing device 4c are provided. Further, the injection device includes an air pipe 5c, a liquid fuel supply pipe 6c, a water supply pipe 7c, a diffuser 8c, and an injection opening 9c of the spray guidance pipe 3c.

SUMMARY OF INVENTION

In the above conventional technique 1, in the dual pipe 5a, the hydrocarbon fuel, which flows through the high calorie combustion gas supply pipe 3a, and the off gas, which flows through the high calorie combustion gas supply pipe 4a, flow in parallel to each other (in the same direction). Therefore, if the structure of the conventional technique 1 is adopted for mixing of the raw fuel and the water vapor, the heat exchange efficiency between the relatively low temperature raw fuel and the relatively high temperature water vapor becomes low, and temperature difference may occur undesirably.

Further, in the conventional technique 2, the kerosene oil fuel injected from the injection port 5b and the water vapor supplied from the water vapor inlet pipe 2b flow in parallel to each other. Therefore, if the structure of the conventional technique 2 is adopted for mixing the raw fuel and the water vapor, the heat exchange efficiency between the relatively low temperature raw fuel and the relatively high temperature water vapor becomes low, and temperature difference may occur undesirably.

Further, in the conventional technique 3, the liquid fuel and water are sent to the mixing device 4c through the liquid fuel supply pipe 6c and the water supply pipe 7c, respectively. The mixed fuel and the air supplied from the air pipe 5c flow in parallel to each other, and the mixed fuel is injected from the injection opening 9c. Therefore, if the structure of the conventional technique 3 is adopted for mixing the raw fuel and the water vapor, the heat exchange efficiency between the relatively low temperature raw fuel and the relatively high temperature water vapor becomes low, and temperature difference may occur undesirably.

The present invention has been made to solve the problem of this type, and an object of the present invention is to provide a fuel cell module having simple and compact structure in which it is possible to achieve improvement in the heat efficiency.

A fuel cell module of the present invention includes a fuel cell stack, a reformer, an evaporator, a heat exchanger, an exhaust gas combustor, and a start-up combustor. The fuel cell stack is formed by stacking a plurality of fuel cells for generating electricity by electrochemical reactions of a fuel gas and an oxygen-containing gas.

The reformer reforms a mixed gas of a raw fuel chiefly containing hydrocarbon and water vapor to produce the fuel gas supplied to the fuel cell stack. The evaporator evaporates water, and supplies the water vapor to the reformer. The heat exchanger raises the temperature of the oxygen-containing gas by heat exchange with a combustion gas, and supplies the oxygen-containing gas to the fuel cell stack. The exhaust gas combustor combusts the fuel gas discharged from the fuel cell stack as a fuel exhaust gas and the oxygen-containing gas discharged from the fuel cell stack as an oxygen-containing exhaust gas to produce the combustion gas. The start-up combustor combusts the raw fuel and the oxygen-containing gas to produce the combustion gas.

The evaporator includes an annular water supply chamber to which the water is supplied, an annular water vapor discharge chamber to which the water vapor is discharged, a plurality of evaporation pipes each having one end connected to the water supply chamber, and another connected to the water vapor discharge chamber, and a combustion gas channel for supplying the combustion gas between the evaporation pipes.

In the fuel cell module, at least one of the evaporation pipes connects the water vapor discharge chamber and an inlet of the reformer to form an evaporation return pipe as a passage of the water vapor, and a raw fuel pipe is inserted into the evaporation return pipe for allowing the raw fuel to flow from the downstream side to the upstream side of the evaporation return pipe.

In the present invention, the evaporator has the annular water supply chamber, the annular water vapor discharge chamber, and the evaporation pipes as basic structure. Thus, simple structure is achieved easily. Accordingly, the production cost of the fuel cell module is reduced as a whole effectively. Further, by changing the volumes of the water supply chamber and the water vapor discharge chamber, the length, the diameter, and the number of the evaporation pipes, a desired operation can be achieved depending on various operating conditions, and a degree of freedom of design for the fuel cell module can be enhanced.

Further, at least one of the evaporation pipes connects the water vapor discharge chamber to the inlet of the reformer to thereby form the evaporation return pipe as a passage of the water vapor. Thus, in a state where the water vapor is maintained at high temperature, the water vapor is mixed with the raw fuel to obtain the mixed gas. Accordingly, improvement in the reforming efficiency is achieved.

Further, the raw fuel pipe is inserted into the evaporation return pipe such that the raw fuel flows from the downstream side to the upstream side of the evaporation return pipe. In the structure, the raw fuel and the water vapor flow in a counterflow manner. Therefore, size reduction of the peripheral equipment is achieved as a whole, and improvement in the heat efficiency is achieved while suppressing heat dissipation.

DESCRIPTION OF EMBODIMENTS

Figure 1:
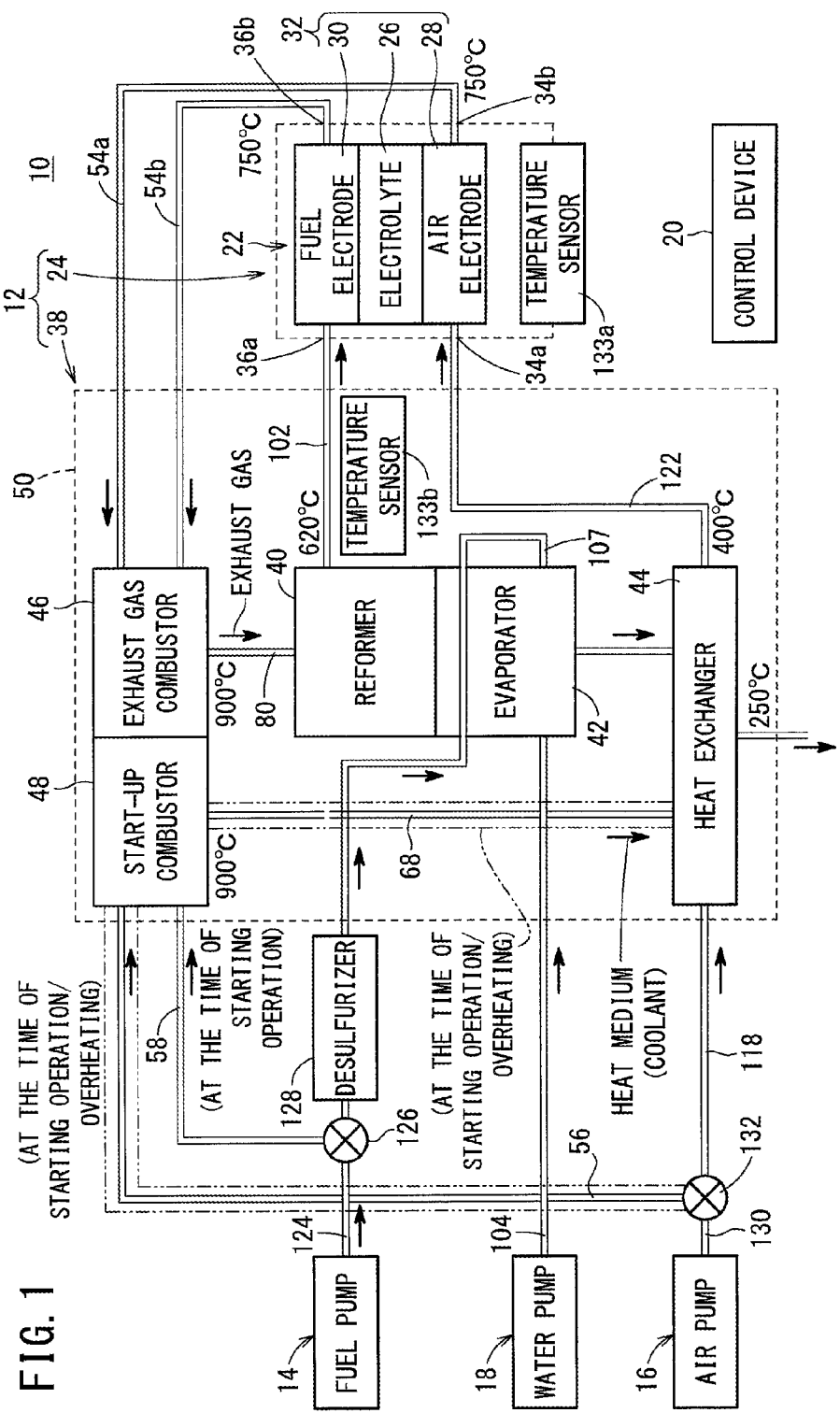
FIG. 1 is a diagram schematically showing structure of a fuel cell system including a fuel cell module according to a first embodiment of the present invention.

As shown in FIG. 1, a fuel cell system 10 includes a fuel cell module (SOFC module) 12 according to a first embodiment of the present invention, and the fuel cell system 10 is used in various applications, including stationary and mobile applications. For example, the fuel cell system 10 is mounted on a vehicle.

The fuel cell system 10 includes the fuel cell module 12, a raw fuel supply apparatus (including a fuel gas pump) 14, an oxygen-containing gas supply apparatus (including an air pump) 16, a water supply apparatus (including a water pump) 18, and a control device 20.

The fuel cell module 12 generates electrical energy in power generation by electrochemical reactions of a fuel gas (a gas produced by mixing a hydrogen gas, methane, and carbon monoxide) and an oxygen-containing gas (air). The raw fuel supply apparatus 14 supplies a raw fuel (e.g., city gas) to the fuel cell module 12. The oxygen-containing gas supply apparatus 16 supplies the oxygen-containing gas to the fuel cell module 12. The water supply apparatus 18 supplies water to the fuel cell module 12. The control device 20 controls the amount of electrical energy generated in the fuel cell module 12.

The fuel cell module 12 includes a solid oxide fuel cell stack 24 formed by stacking a plurality of solid oxide fuel cells 22 in a vertical direction (or horizontal direction). The fuel cell 22 includes an electrolyte electrode assembly (MEA) 32. The electrolyte electrode assembly 32 includes a cathode (air electrode) 28, an anode (fuel electrode) 30, and an electrolyte 26 interposed between the cathode 28 and the anode 30. For example, the electrolyte 26 is made of ion-conductive solid oxide such as stabilized zirconia.

The electrolyte electrode assembly 32 is sandwiched between separators (not shown). As the fuel cell 22, various types of conventional SOFCs can be adopted.

The operating temperature of the fuel cell 22 is high, at several hundred ° C. Methane in the fuel gas is reformed at the anode 30 to obtain hydrogen and CO, and the hydrogen and CO are supplied to a portion of the electrolyte 26 adjacent to the anode 30.

An oxygen-containing gas supply passage 34a, an oxygen-containing gas discharge passage 34b, a fuel gas supply passage 36a, and a fuel gas discharge passage 36b extend through the fuel cell stack 24. The oxygen-containing gas supply passage 34a is connected to an oxygen-containing gas inlet at the cathode 28, the oxygen-containing gas discharge passage 34b is connected to an oxygen-containing gas outlet at the cathode 28, the fuel gas supply passage 36a is connected to a fuel gas inlet at the anode 30, and the fuel gas discharge passage 36b is connected to a fuel gas outlet at the anode 30.

The fuel cell module 12 includes the fuel cell stack 24 and FC (fuel cell) peripheral equipment (BOP) 38 connected to the fuel cell stack 24 for allowing the fuel cells 22 to perform power generation. The FC peripheral equipment 38 includes a reformer 40, an evaporator 42, a heat exchanger 44, an exhaust gas combustor 46, and a start-up combustor 48. These components are placed in a casing 50.

The reformer 40 reforms a mixed gas of a raw fuel chiefly containing hydrocarbon (e.g., city gas) and water vapor to produce a fuel gas supplied to the fuel cell stack 24. The evaporator 42 evaporates water and supplies the water vapor to the reformer 40. The heat exchanger 44 heats the oxygen-containing gas by heat exchange with a combustion gas, and supplies the oxygen-containing gas to the fuel cell stack 24. The exhaust gas combustor 46 combusts the fuel gas discharged from the fuel cell stack 24 as a fuel exhaust gas and the oxygen-containing gas discharged from the fuel cell stack 24 as an oxygen-containing exhaust gas to produce the combustion gas. The start-up combustor 48 combusts the raw fuel and the oxygen-containing gas to produce the combustion gas.

Figure 3:
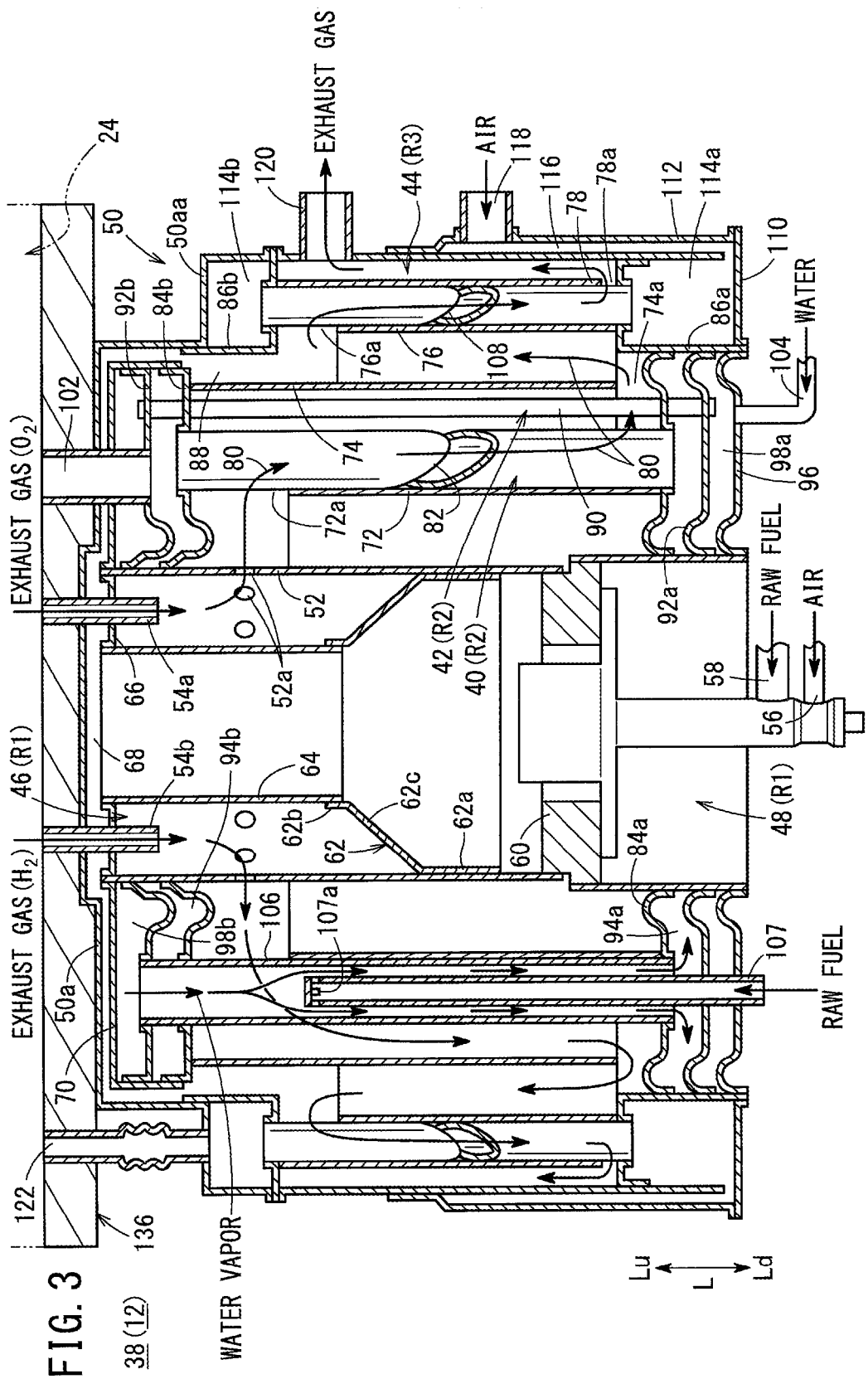
FIG. 3 is a cross sectional view showing the FC peripheral equipment.
Figure 4:
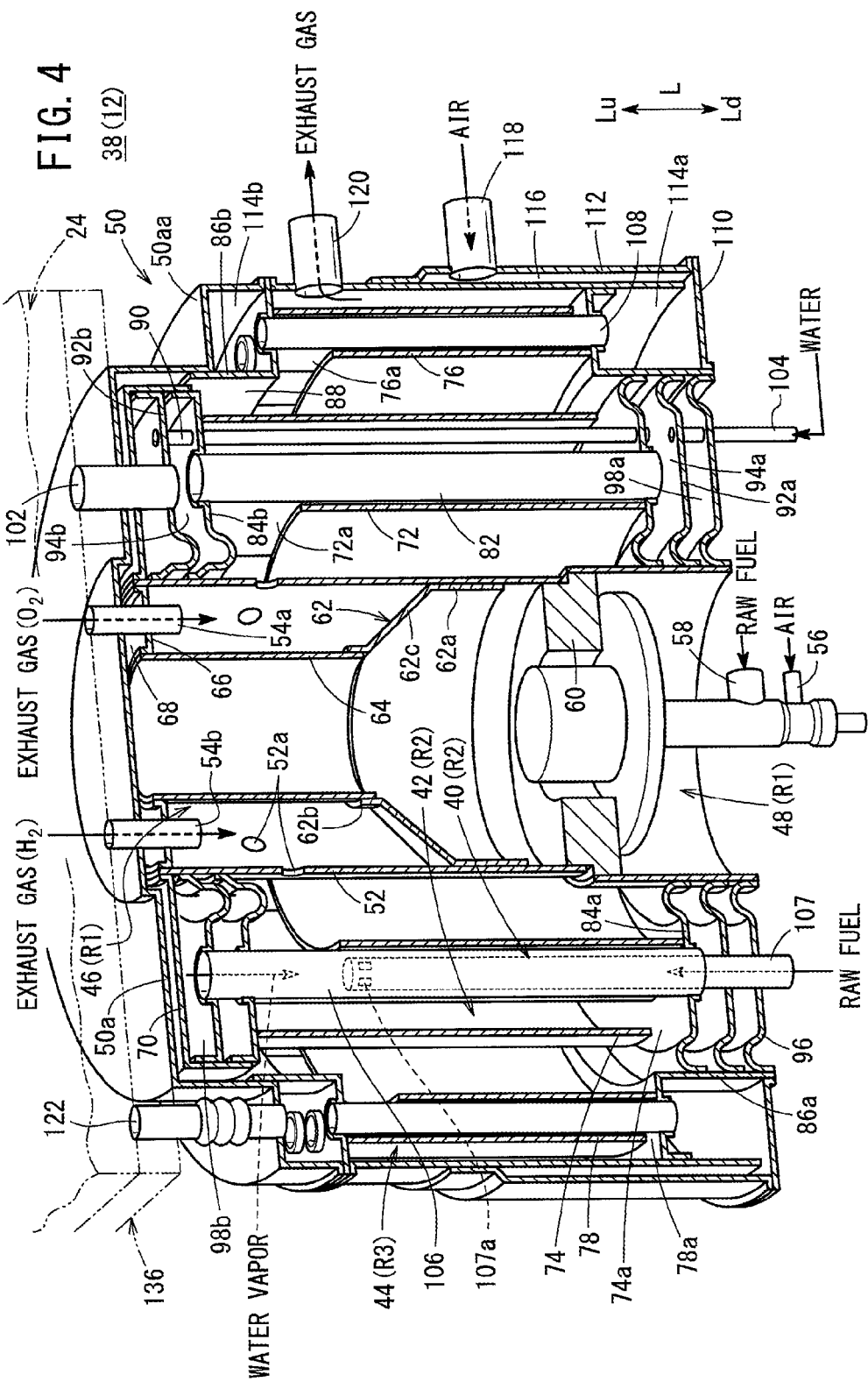
FIG. 4 is a perspective view with partial omission showing the FC peripheral equipment.
Figure 5:
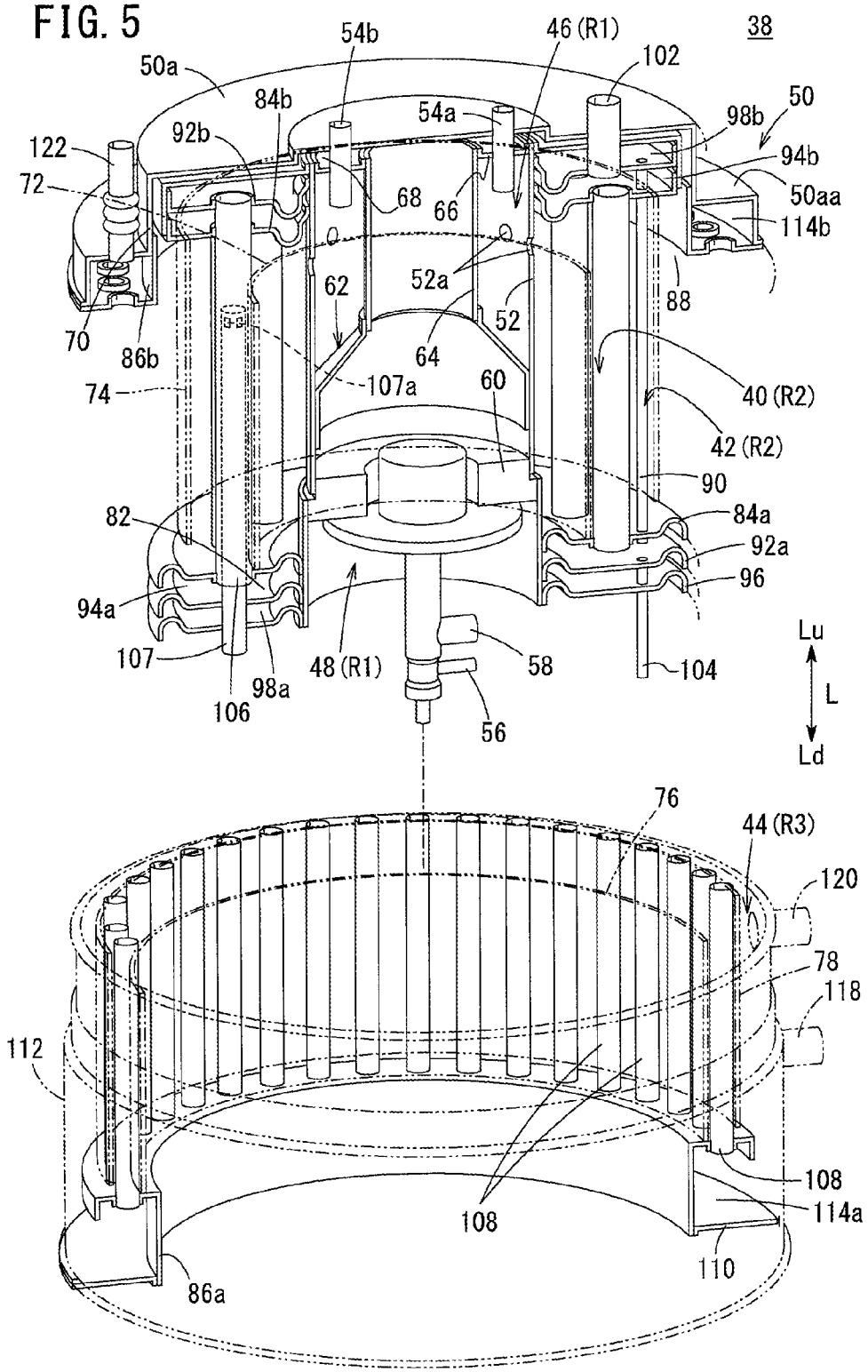
FIG. 5 is an exploded perspective view showing main components of the FC peripheral equipment.

As shown in FIGS. 3 to 5, in the FC peripheral equipment 38, the casing 50 includes therein a first area (central area) R1. In the first area R1, the exhaust gas combustor 46 is disposed in proximity to the fuel cell stack 24, and the start-up combustor 48 is disposed remotely from the fuel cell stack 24. The casing 50 also includes therein a second area (outer annular area) R2 annularly formed around the first area R1. In the second area R2, the reformer 40 and the evaporator 42 are provided. Further, the casing 50 includes a third area (outer annular area) R3 annularly formed around the second area R2. In the third area R3, the heat exchanger 44 is provided.

The first area R1 is defined by a cylindrical tubular portion 52 disposed on one end closer to the fuel cell stack 24. The tubular portion 52 extends from the exhaust gas combustor 46 toward the start-up combustor 48. A plurality of holes (e.g., circular holes or rectangular holes) 52a are formed in an outer wall of the tubular portion 52 positioned closer to the fuel cell stack 24.

One end of an oxygen-containing exhaust gas channel 54a and one end of a fuel exhaust gas channel 54b are provided in the tubular portion 52 to form the exhaust gas combustor 46 (see FIGS. 1 and 3). In the tubular portion 52, a combustion gas is produced by combustion reaction of the fuel gas (specifically, fuel exhaust gas) and the oxygen-containing gas (specifically, oxygen-containing exhaust gas). As shown in FIG. 1, the other end of the oxygen-containing exhaust gas channel 54a is connected to the oxygen-containing gas discharge passage 34b of the fuel cell stack 24. The other end of the fuel exhaust gas channel 54b is connected to the fuel gas discharge passage 36b of the fuel cell stack 24.

The start-up combustor 48 includes an air supply pipe 56 and a raw fuel supply pipe 58. The start-up combustor 48 has an ejector function, and generates negative pressure in the raw fuel supply pipe 58 by the flow of air supplied from the air supply pipe 56 for suctioning the raw fuel.

As shown in FIGS. 3 to 5, the start-up combustor 48 includes a sleeve member 60. The sleeve member 60 is slidably fitted into an end of the tubular portion 52. The start-up combustor 48 is separated from the exhaust gas combustor 46 by a multi-step tubular member 62 of the exhaust gas combustor 46. The multi-step tubular member 62 includes a large diameter ring portion 62a, a small diameter ring portion 62b, and an inclined ring portion 62c connecting the large diameter ring portion 62a and the small diameter ring portion 62b.

The large diameter ring portion 62a is fitted into the tubular portion 52 so as to be slidable on the inner circumferential surface of the tubular portion 52, and the small diameter ring portion 62b is welded to one end of a tubular member 64. The tubular member 64 is provided inside and coaxially with the tubular portion 52. The other end of the tubular member 64 is fixed to a closure ring 66. The exhaust gas combustor 46 is provided in a space surrounded by the inner circumferential surface of the tubular portion 52, the outer circumferential surface of the multi-step tubular member 62, and the closure ring 66.

A substantially circular disc shaped wall surface 50a formed as an outer surface of the casing 50 is provided on a side closer to the fuel cell stack 24, and a bypass channel 68 is formed along the inner surface of the wall surface 50a. The bypass channel 68 is provided to bypass a combustion gas channel 80 described later. The bypass channel 68 is formed between the closure ring 66 and a partition plate 70 surrounding the closure ring 66, and the inner surface of the wall surface 50a. The shape of the partition plate 70 corresponds to the inner surface shape of the wall surface 50a, and the partition plate 70 is formed in a ring shape by bending the outer circumference of a hollow circular disk in an axial direction.

The bypass channel 68 extends from the central area along the wall surface 50a adjacent to the fuel cell stack 24, and at a position between the outermost annular area and the second outermost annular area (i.e., the annular area inside the outermost annular area), the bypass channel 68 is merged into the combustion gas channel 80. Specifically, the bypass channel 68 extends from the inside the tubular member 64 in the first area R1, i.e., from the start-up combustor 48, to a boundary between the third area R3 and the second area R2 along the wall surface 50a.

A cylindrical first partition plate 72 is positioned in the casing 50, between the first area R1 and the second area R2. A cylindrical second partition plate 74 and a cylindrical third partition plate 76 are positioned between the second area R2 and the third area R3. A cylindrical fourth partition plate 78 is provided between the third area R3 and the inner surface of the casing 50.

The first partition plate 72 has a first combustion gas connection channel (or a plurality of holes) 72a formed by cutting out its end closer to the exhaust gas combustor 46. The second partition plate 74 has a second combustion gas connection channel (or a plurality of holes) 74a formed by cutting out its end closer to the start-up combustor 48. The third partition plate 76 has a third combustion gas connection channel (or a plurality of holes) 76a formed by cutting out its end closer to the exhaust gas combustor 46. The fourth partition plate 78 has a fourth combustion gas connection channel (or a plurality of holes) 78a formed by cutting out its end closer to the start-up combustor 48.

In the casing 50, the combustion gas channel 80 is formed by the first partition plate 72, the second partition plate 74, the third partition plate 76, and the fourth partition plate 78 for allowing the combustion gas to flow from the exhaust gas combustor 46 (central area) to the second area R2 (outer annular area), and then, flow from the second area R2 to the third area R3 (outer annular area).

The reformer 40 is a preliminary reformer for steam-reforming higher hydrocarbon ($C_{2+}$) such as ethane ($C_2H_6$), propane ($C_3H_8$), and butane ($C_4H_{10}$) contained in the city gas (raw fuel) to produce the fuel gas chiefly containing methane ($CH_4$), hydrogen, and CO. The operating temperature of the reformer 40 is set to several hundred ° C.

As shown in FIGS. 3 to 5, the reformer 40 includes a plurality of reforming pipes (heat transmission pipes) 82 provided around the exhaust gas combustor 46 and the start-up combustor 48. Each of the reforming pipes 82 is filled with reforming catalyst pellets (not shown). One end (lower end) of each of the reforming pipes 82 is fixed to a first lower ring member 84a, and the other end (upper end) thereof is fixed to a first upper ring member 84b.

The inner circumferential portion of the first lower ring member 84a is fixed to the outer circumferential portion of the start-up combustor 48 by welding or the like. The outer circumferential portion of the first lower ring member 84a is fixed to the inner surface of a substantially cylindrical lower partition plate 86a by welding or the like. The inner circumferential portion of the first upper ring member 84b is fixed to the outer circumferential portion of the tubular portion 52 by welding or the like, and the outer circumferential portion of the first upper ring member 84b is fixed to the inner circumferential surface at the upper end of the partition plate 70 by welding or the like. A substantially cylindrical upper partition plate 86b is provided adjacent to the first upper ring member 84b, and a connection channel 88 connecting the bypass channel 68 to the combustion gas channel 80 is formed between the upper partition plate 86b and the second partition plate 74.

Figure 6:
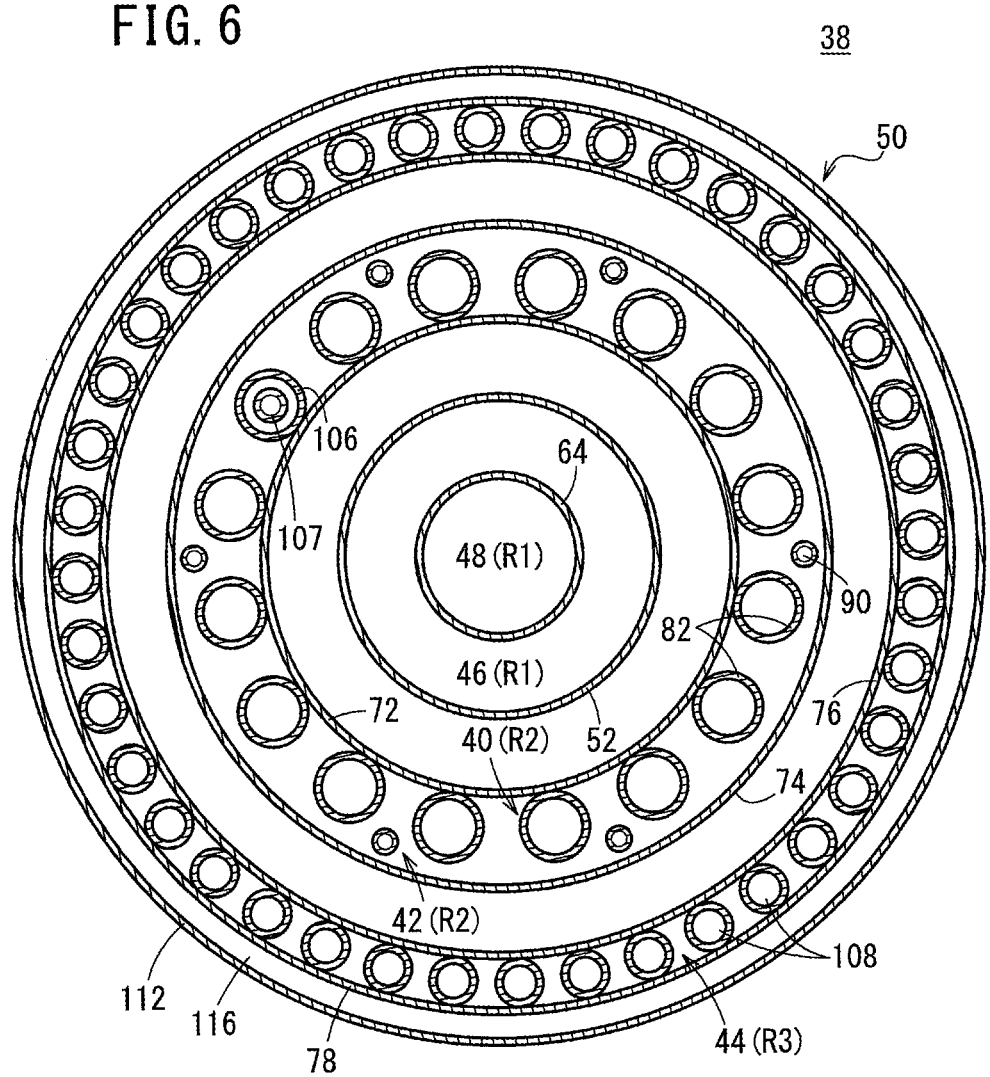
FIG. 6 is cross sectional plan view showing the FC peripheral equipment.

The evaporator 42 has a plurality of evaporation pipes (heat transmission pipes) 90 provided adjacent to the reforming pipes 82 of the reformer 40. As shown in FIG. 6, the reforming pipes 82 are arranged at equal intervals on a virtual circle, concentrically around the first area R1. The evaporation pipes 90 are arranged at predetermined positions between the reforming pipes 82.

As shown in FIGS. 3 and 4, one end (lower end) of each of the evaporation pipes 90 is connected to a second lower ring member 92a by welding or the like, and the other end (upper end) of each of the evaporation pipes 90 is connected to a second upper ring member 92b by welding or the like.

The inner circumferential portion of the second lower ring member 92a is fixed to the outer circumferential portion of the start-up combustor 48 by welding or the like, and the outer circumferential portion of the second lower ring member 92a is fixed to the inner surface of the lower partition plate 86a by welding or the like. The inner circumferential portion of the second upper ring member 92b is fixed to the outer circumferential portion of the tubular portion 52 by welding or the like. Further, the outer circumferential portion of the second upper ring member 92b is fixed to the inner circumferential surface at the front end of the partition plate 70 by welding or the like.

The second lower ring member 92a is positioned below the first lower ring member 84a (outside the first lower ring member 84a in the axial direction), and the second upper ring member 92b is positioned above the first upper ring member 84b (outside the first upper ring member 84b in the axial direction).

An annular mixed gas supply chamber 94a is formed between the first lower ring member 84a and the second lower ring member 92a, and a mixed gas of raw fuel and water vapor is supplied to the mixed gas supply chamber 94a. Further, an annular fuel gas discharge chamber 94b is formed between the first upper ring member 84b and the second upper ring member 92b, and the produced fuel gas (reformed gas) is discharged to the fuel gas discharge chamber 94b. Both ends of each of the reforming pipes 82 are opened respectively to the mixed gas supply chamber 94a and the fuel gas discharge chamber 94b.

A ring shaped end ring member 96 is fixed to a lower end of the lower partition plate 86a by welding or the like. An annular water supply chamber 98a is formed between the end ring member 96 and the second lower ring member 92a, and water is supplied to the water supply chamber 98a. A water vapor discharge chamber 98b is formed between the second upper ring member 92b and the partition plate 70, and water vapor is discharged to the water vapor discharge chamber 98b. Both ends of each of the evaporation pipes 90 are opened respectively to the water supply chamber 98a and the water vapor discharge chamber 98b.

The fuel gas discharge chamber 94b and the water vapor discharge chamber 98b are arranged in a double-deck manner, and the fuel gas discharge chamber 94b is positioned inside (below) the water vapor discharge chamber 98b. The mixed gas supply chamber 94a and the water supply chamber 98a are arranged in a double-deck manner, and the mixed gas supply chamber 94a is positioned inside (above) the water supply chamber 98a.

A lower end of an evaporation return pipe 106 described later is opened to the mixed gas supply chamber 94a. One end of a fuel gas channel 102 is connected to the fuel gas discharge chamber 94b, and the other end of the fuel gas channel 102 is connected to the fuel gas supply passage 36a of the fuel cell stack 24 (see FIG. 1). The fuel gas channel 102 is fixed to the second upper ring member 92b by welding or the like.

A water channel 104 is connected to the water supply chamber 98a. The water channel 104 is fixed to the end ring member 96 by welding or the like. One end of the evaporation return pipe 106 having at least one evaporation pipe 90 as a passage of water vapor is connected to the water vapor discharge chamber 98b. The diameter of the evaporation return pipe 106 is larger than the diameter of the evaporation pipe 90. For example, the diameter of the evaporation return pipe 106 is the same as the diameter of the reforming pipe 82. One end of the evaporation return pipe 106 is fixed to the second upper ring member 92b by welding or the like, and the other end of the evaporation return pipe 106 is connected to the first lower ring member 84a by welding or the like.

A raw fuel pipe 107 is inserted into the evaporation return pipe 106 for allowing the raw fuel to flow from the downstream side to the upstream side of the evaporation return pipe 106. One or more, preferably, a plurality of, raw fuel supply ports (e.g., holes) 107a are formed in the raw fuel pipe 107 to connect the inside of the raw fuel pipe 107 and the inside of the evaporation return pipe 106.

The raw fuel pipe 107 extends inside the evaporation return pipe 106 to a position adjacent to the water vapor discharge chamber 98b. The raw fuel supply ports 107a are provided at positions adjacent to the water vapor discharge chamber 98b, and the raw fuel supply ports 107a are opened at the front end in the outer circumferential portion of the raw fuel pipe 107 at intervals of a predetermined angle. The raw fuel flowing through the raw fuel pipe 107 in a direction indicated by an arrow Lu and the water vapor flowing through the evaporation return pipe 106 in a direction indicated by an arrow Ld flow in a counterflow manner. The raw fuel is mixed with the water vapor through the raw fuel supply ports 107a utilizing Venturi effect. A lower end of the raw fuel pipe 107 is fixed to the second lower ring member 92a and the end ring member 96 by welding or the like.

As shown in FIGS. 3 and 4, the heat exchanger 44 includes a plurality of heat exchange pipes (heat transmission pipes) 108. One end (lower end) of each of the heat exchange pipes 108 is fixed to the lower partition plate 86a, and the other end (upper end) thereof is fixed to the upper partition plate 86b.

A lower end ring member 110 is provided outside the lower partition plate 86a, and an upper end ring portion 50aa is provided outside the upper partition plate 86b. The upper end ring portion 50aa is connected to the wall surface 50a in a stepwise manner. The lower end ring member 110 is fixed to the inner plate portion of the lower partition plate 86a and the inner circumference of a cylindrical cover member 112 by welding or the like.

An annular oxygen-containing gas supply chamber 114a is formed between the lower partition plate 86a and the lower end ring member 110. An oxygen-containing gas is supplied to the oxygen-containing gas supply chamber 114a. An annular oxygen-containing gas discharge chamber 114b is formed between the upper partition plate 86b and the upper end ring portion 50aa. The heated oxygen-containing gas is discharged to the oxygen-containing gas discharge chamber 114b. Both ends of each of the heat exchange pipes 108 are fixed respectively to the lower partition plate 86a and the upper partition plate 86b by welding or the like, and opened respectively to the oxygen-containing gas supply chamber 114a and the oxygen-containing gas discharge chamber 114b.

The mixed gas supply chamber 94a and the water supply chamber 98a are positioned radially inwardly with respect to the oxygen-containing gas supply chamber 114a. The oxygen-containing gas discharge chamber 114b is provided at a position shifted outward and downward with respect to the fuel gas discharge chamber 94b.

Both of upper and lower ends (both ends in the axial direction) of the cover member 112 are fixed to the outer circumference of the casing 50 by welding or the like, and a heat recovery area (chamber) 116 is formed between the cover member 112 and the outer circumference of the casing 50.

Figure 2:
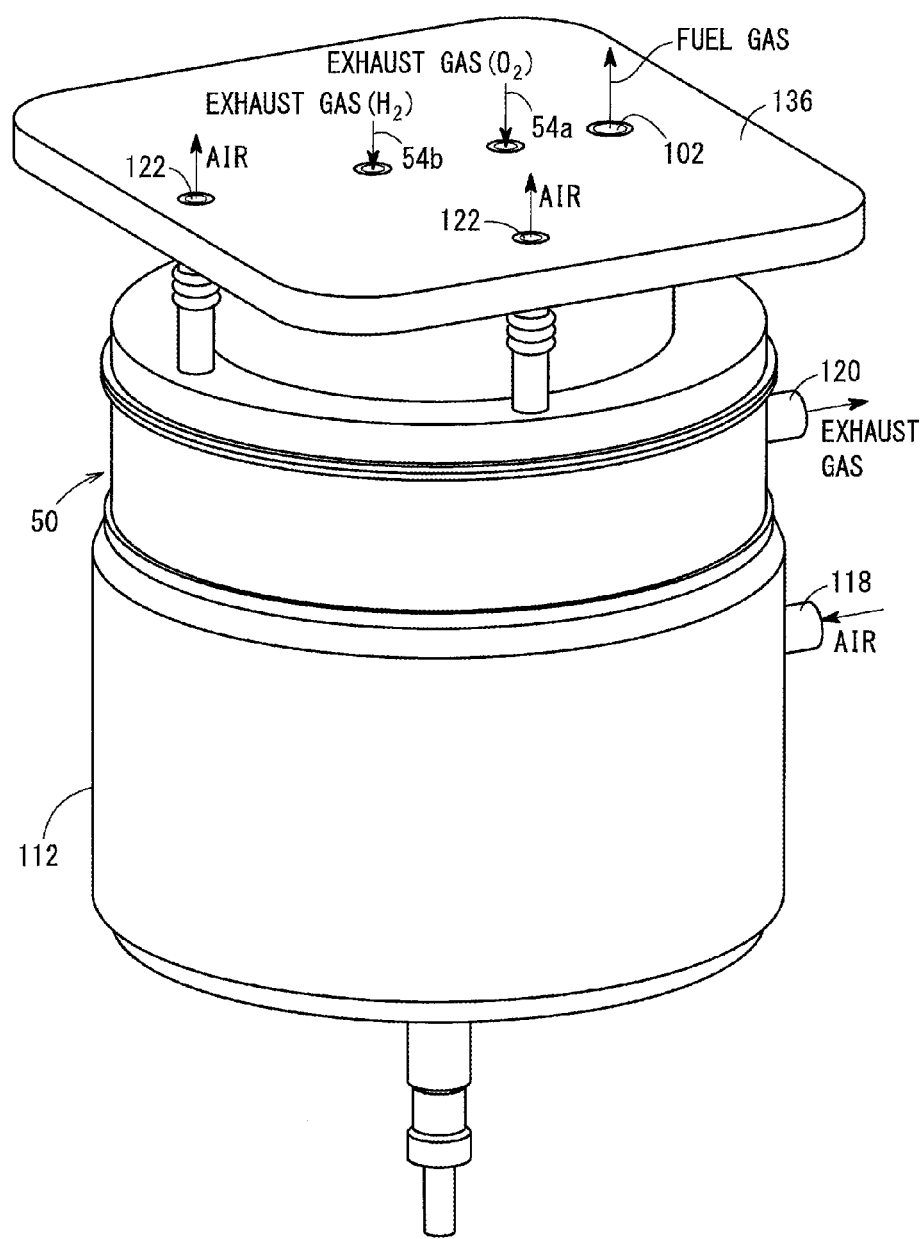
FIG. 2 is a perspective view schematically showing FC peripheral equipment of the fuel cell module.

The oxygen-containing gas supply chamber 114a is connected to the heat recovery area 116. An oxygen-containing gas supply pipe 118 communicating with the heat recovery area 116 is connected to the cover member 112. An exhaust gas pipe 120 communicating with the third area R3 is connected to an upper portion of the casing 50. For example, one end of each of two oxygen-containing gas pipes 122 is provided in the oxygen-containing gas discharge chamber 114b (see FIG. 2). The other end of each of the oxygen-containing gas pipes 122 is connected to the oxygen-containing gas supply passage 34a of the fuel cell stack 24 (see FIG. 1).

As shown in FIG. 1, the raw fuel supply apparatus 14 includes a raw fuel channel 124. The raw fuel channel 124 is branched into the raw fuel pipe 107 and the raw fuel supply pipe 58 through a raw fuel regulator valve 126. A desulfurizer 128 for removing sulfur compounds contained in the city gas (raw fuel) is provided in the raw fuel pipe 107.

The oxygen-containing gas supply apparatus 16 includes an oxygen-containing gas channel 130. The oxygen-containing gas channel 130 is branched into the oxygen-containing gas supply pipe 118 and the air supply pipe 56 through an oxygen-containing gas regulator valve 132. The water supply apparatus 18 is connected to the evaporator 42 through the water channel 104. A temperature sensor 133a is provided in the fuel cell stack 24, and a temperature sensor 133b is provided in the reformer 40.

Figure 7:
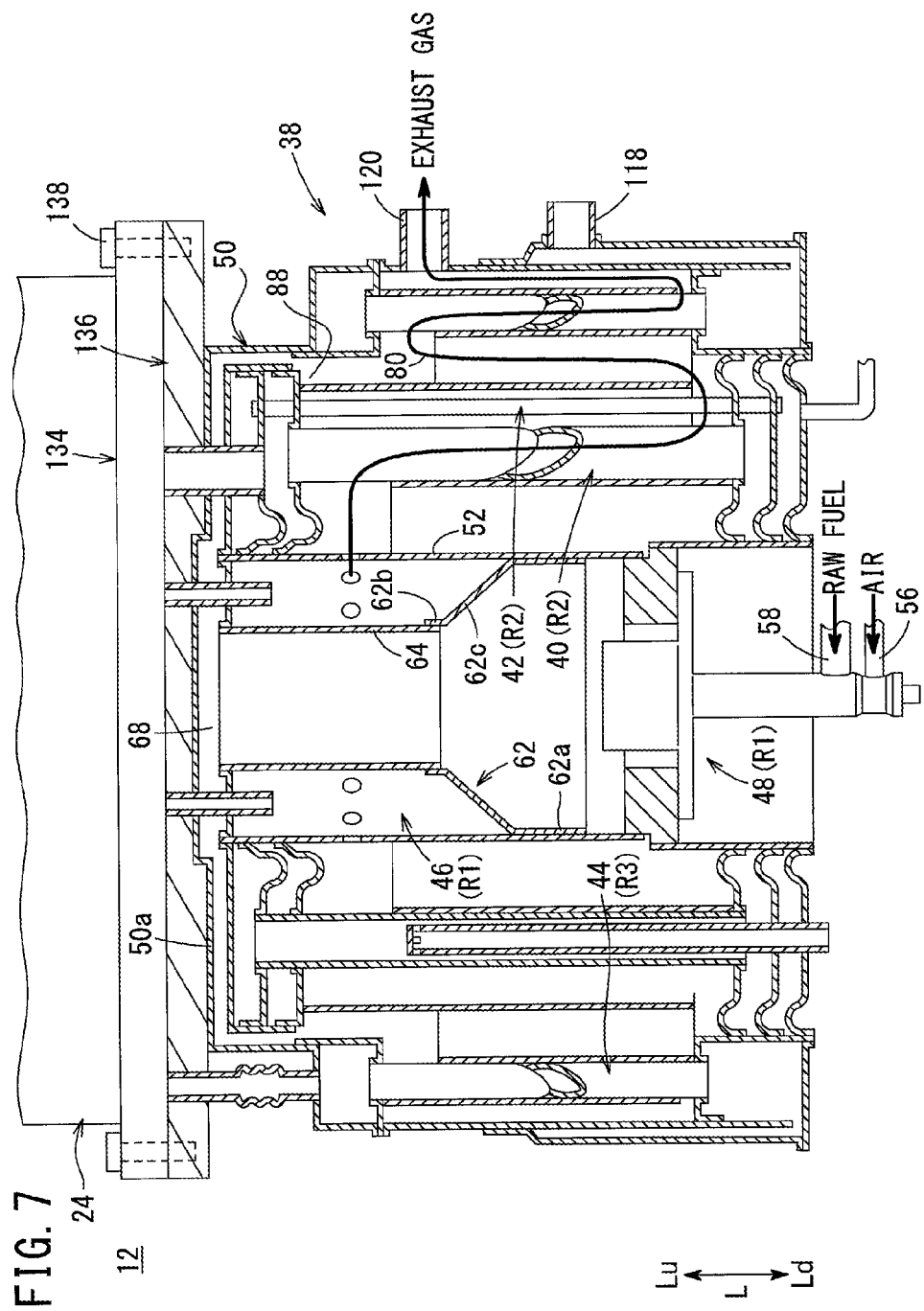
FIG. 7 is a view showing operation at the time of starting operation of the fuel cell module.

As shown in FIG. 7, a first plate 134 is fixed to an end of the fuel cell stack 24. A second plate 136 is fixed to the end of the casing 50 of the FC peripheral equipment 38. The first plate 134 and the second plate 136 are tightened together using locking screws 138. Channels (not shown) as passages of the fuel gas, the oxygen-containing gas, the fuel exhaust gas, and the oxygen-containing exhaust gas are formed in the first plate 134 and the second plate 136. The bypass channel 68 is formed along the second plate 136 (see FIG. 3).

Operation of the fuel cell system 10 will be described below.

At the time of starting operation of the fuel cell system 10, air (oxygen-containing gas) and raw fuel are supplied to the start-up combustor 48. Specifically, as shown in FIG. 1, in the oxygen-containing gas supply apparatus 16, by operation of the air pump, the air is supplied to the oxygen-containing gas channel 130. By adjusting the opening degree of the oxygen-containing gas regulator valve 132, the air is supplied to the air supply pipe 56.

In the meanwhile, in the raw fuel supply apparatus 14, by operation of the fuel gas pump, for example, raw fuel such as the city gas (containing $CH_4$, $C_2H_6$, $C_3H_8$, $C_4H_{10}$) is supplied to the raw fuel channel 124. By regulating the opening degree of the raw fuel regulator valve 126, the raw fuel is supplied into the raw fuel supply pipe 58. The raw fuel is mixed with the air, and supplied into the start-up combustor 48.

Thus, as shown in FIG. 7, the mixed gas of the raw fuel and the air is supplied into the start-up combustor 48, and the mixed gas is ignited to start combustion. Therefore, the combustion gas produced in combustion flows from the large diameter ring portion 62a to the small diameter ring portion 62b in the multi-step tubular member 62 (in the direction indicated by an arrow Lu), and the combustion gas is supplied to the bypass channel 68 through the tubular member 64.

The combustion gas supplied to the bypass channel 68 moves outward (outward in the radial direction) from the exhaust gas combustor 46 in the central area along the wall surface 50a of the casing 50. After the combustion gas flows into the connection channel 88 at the boundary between the third area R3 as the outermost annular area and the second area R2 as the annular area inside the third area R3, the combustion gas is merged into the combustion gas channel 80. In the structure, since the combustion gas flows along the second plate 136, the temperature of the second plate 136 is increased.

Since the first plate 134 is fixed to the second plate 136, the heat is transmitted from the second plate 136 to the first plate 134 suitably. At this time, since the first plate 134 is fixed to the end of the fuel cell stack 24, the temperature of the fuel cell stack 24 is increased rapidly by the heat from the combustion gas.

The temperature of the fuel cell stack 24 is detected by the temperature sensor 133a (see FIG. 1). When the control device 20 judges that the temperature of the fuel cell stack 24 is increased to a predetermined temperature, operation is switched from start-up operation to rated operation. That is, the air (oxygen-containing gas) is supplied to the heat exchanger 44, and the mixed gas of the raw fuel and the water vapor is supplied to the reformer 40.

Specifically, as shown in FIG. 1, the opening degree of the oxygen-containing gas regulator valve 132 is adjusted such that the flow rate of the air supplied to the oxygen-containing gas supply pipe 118 is increased, and the opening degree of the raw fuel regulator valve 126 is adjusted such that the flow rate of the raw fuel supplied to the raw fuel pipe 107 is increased. Further, by operation of the water supply apparatus 18, the water is supplied to the water channel 104. As shown in FIG. 3, the air is supplied from the oxygen-containing gas supply pipe 118 to the heat recovery area 116 in the cover member 112. Thus, the air flows into the oxygen-containing gas supply chamber 114a.

Figure 8:
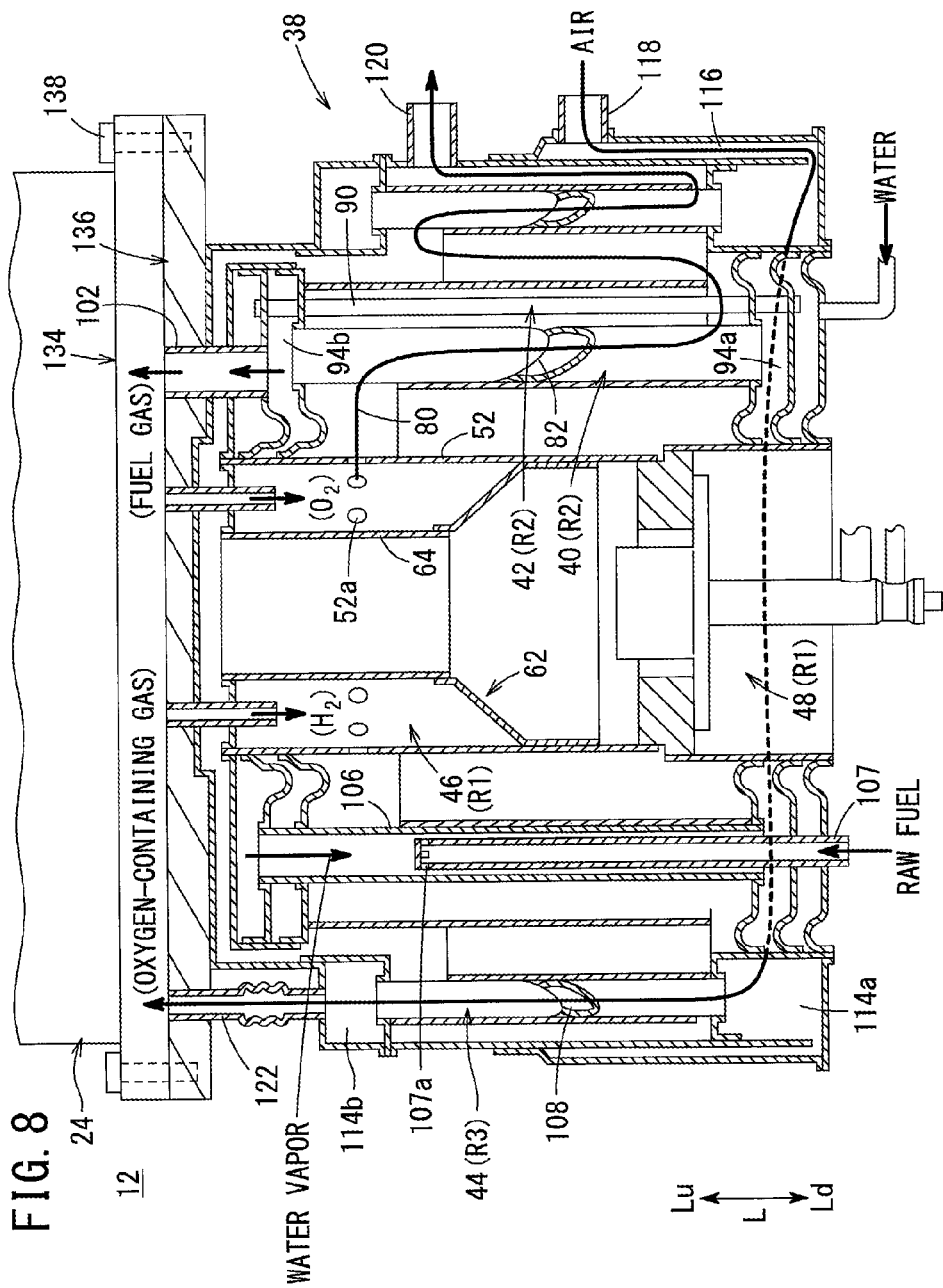
FIG. 8 is a view showing operation at the time of rated operation of the fuel cell module.

Therefore, as shown in FIGS. 3 and 8, the air supplied into the heat exchanger 44 is temporarily supplied to the oxygen-containing gas supply chamber 114a. Thereafter, while the air is moving inside the heat exchange pipes 108, the air is heated by heat exchange with the combustion gas supplied into the third area R3 described later. After the heated air is temporarily supplied to the oxygen-containing gas discharge chamber 114b, the air is supplied to the oxygen-containing gas supply passage 34a of the fuel cell stack 24 through the oxygen-containing gas pipe 122 (see FIG. 1). In the fuel cell stack 24, the heated air is supplied to the cathode 28.

After the air flows along the cathode 28, the air is discharged from the oxygen-containing gas discharge passage 34b into the oxygen-containing exhaust gas channel 54a. The oxygen-containing exhaust gas channel 54a is opened to the tubular portion 52 of the exhaust gas combustor 46. Therefore, the oxygen-containing exhaust gas flows into a space between the inner circumference of the tubular portion 52 and the outer circumference of the tubular member 64.

Further, as shown in FIG. 1, the water from the water supply apparatus 18 is supplied to the evaporator 42. The raw fuel desulfurized by the desulfurizer 128 flows through the raw fuel pipe 107 toward the evaporation return pipe 106. In the evaporator 42, as shown in FIG. 3, after the water is temporarily supplied to the water supply chamber 98a, while the water is moving inside the evaporation pipes 90, the water is heated by the combustion gas flowing through the second area R2, and then vaporized.

After the water vapor temporarily flows into the water vapor discharge chamber 98b, the water vapor is supplied to the evaporation return pipe 106 connected to the water vapor discharge chamber 98b. Thus, the water vapor flows through the evaporation return pipe 106 in the direction indicated by the arrow Ld. In the evaporation return pipe 106, the raw fuel pipe 107 extends to a position adjacent to the water vapor discharge chamber 98b. The raw fuel supply ports 107a are opened at positions adjacent to the water vapor discharge chamber 98b.

In the first embodiment, the raw fuel pipe 107 includes the raw fuel supply ports 107a connecting the inside of the raw fuel pipe 107 and the inside of the evaporation return pipe 106. In the structure, the raw fuel from the raw fuel pipe 107 can be suitably mixed with the water vapor flowing through the evaporation return pipe 106 by using Venturi effect.

Further, the raw fuel, which flows through the raw fuel pipe 107 in the direction indicated by the arrow Lu, and the water vapor (in effect, the mixed gas), which flows through the evaporation return pipe 106 in the direction indicated by the arrow Ld, flow in a counterflow manner. That is, the mixed gas of the raw fuel and the water vapor flows through the evaporation return pipe 106 toward the mixed gas supply chamber 94a in the direction indicated by the arrow Ld, and the raw fuel flows through the raw fuel pipe 107 upward from the mixed gas supply chamber 94a in the direction indicated by the arrow Lu.

Figure 9:
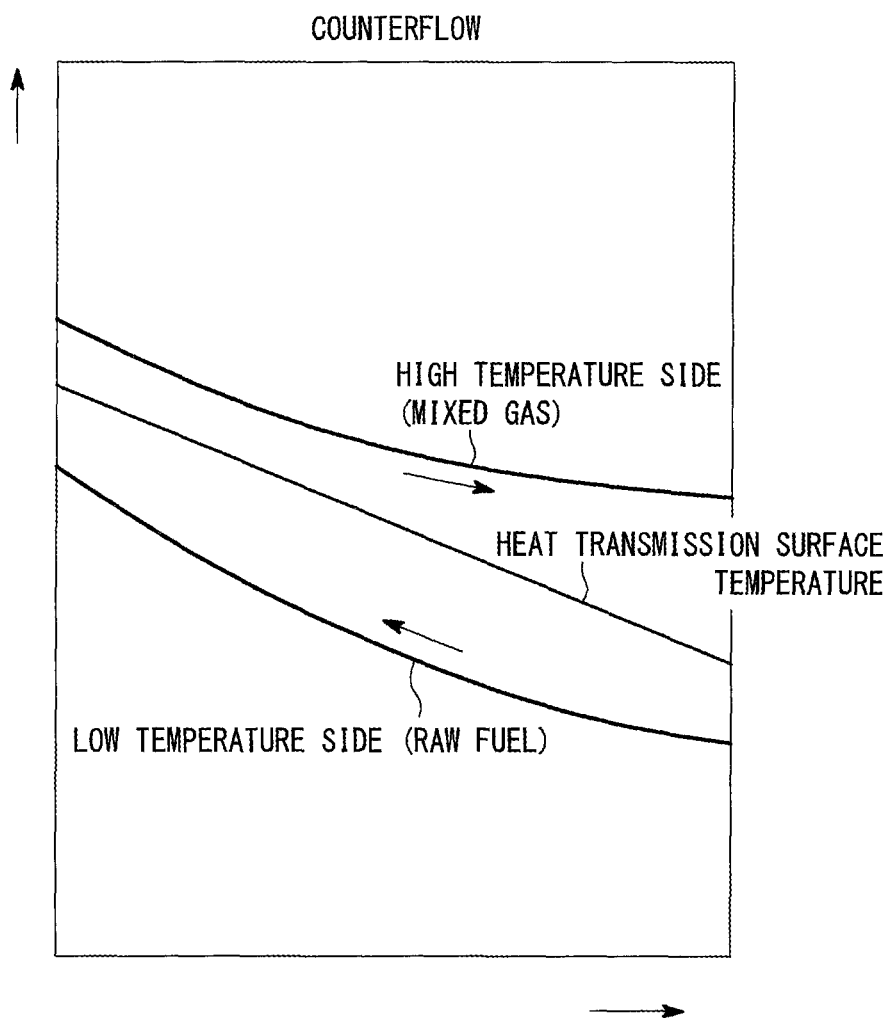
FIG. 9 is a graph showing the temperature in a heat transmission surface in a case where gases flow in a counterflow manner.

At this time, as shown in FIG. 9, in the case where the gases flow in a counterflow manner, the heat exchange efficiency is good, and the temperature in the heat transmission surface is high. Therefore, improvement in the heat exchange efficiency between the relatively low temperature raw fuel and the relatively high temperature mixed gas is achieved. In addition, it becomes possible to regulate the temperature of the raw fuel and the temperature of the mixed gas in order to equalize the temperatures. Accordingly, improvement in the reforming efficiency is achieved.

As shown in FIGS. 3 and 8, the mixed gas from the evaporation return pipe 106 is temporarily supplied to the mixed gas supply chamber 94a of the reformer 40. The mixed gas moves inside the reforming pipes 82. During that time of moving through the reforming pipes 82, the mixed gas is heated by the combustion gas flowing through the second area R2, and subjected to steam reforming. As a result, removal (reforming) of hydrocarbon of $C_{2+}$ is carried out, whereby a reformed gas chiefly containing methane is obtained.

This reformed gas is temporarily supplied as the heated fuel gas to the fuel gas discharge chamber 94b. Thereafter, the fuel gas is supplied to the fuel gas supply passage 36a of the fuel cell stack 24 through the fuel gas channel 102 (see FIG. 1). In the fuel cell stack 24, the heated fuel gas is supplied to the anode 30. In the meanwhile, the air is supplied to the cathode 28. Consequently, electricity is generated in the electrolyte electrode assembly 32.

After the fuel gas flows through the anode 30, the fuel gas is discharged from the fuel gas discharge passage 36b to the fuel exhaust gas channel 54b. The fuel exhaust gas channel 54b is opened to the inside of the tubular portion 52 of the exhaust gas combustor 46, and the fuel exhaust gas is supplied into a space between the inner circumference of the tubular portion 52 and the outer circumference of the tubular member 64.

Under the heating operation by the start-up combustor 48, when the temperature of the fuel gas in the exhaust gas combustor 46 exceeds the self-ignition temperature, combustion of the oxygen-containing exhaust gas and the fuel exhaust gas is started inside the tubular portion 52. In the meanwhile, combustion operation by the start-up combustor 48 is stopped.

The tubular portion 52 has the plurality of holes 52a. In the structure, as shown in FIG. 8, the combustion gas produced between the inner circumference of the tubular portion 52 and the outer circumference of the tubular member 64 passes through the holes 52a, and flows into the combustion gas channel 80. In the combustion gas channel 80, as shown in FIG. 3, the combustion gas flows through the first combustion gas connection channel 72a formed in the first partition plate 72, and the combustion gas flows from the first area R1 to the second area R2.

After the combustion gas flows through the second area R2 in the direction indicated by the arrow Ld (in the downward direction), the combustion gas flows through the second combustion gas connection channel 74a formed in the second partition plate 74, and the combustion gas is supplied into a space between the second area R2 and the third area R3. The combustion gas flows in the direction indicated by the arrow Lu (upward direction), and then, the combustion gas flows through the third combustion gas connection channel 76a formed in the third partition plate 76 into the third area R3. After the combustion gas flows through the third area R3 in the direction indicated by the arrow Ld, the combustion gas is discharged from the fourth combustion gas connection channel 78a formed in the fourth partition plate 78 to the outer area. The combustion gas flows in the direction indicated by the arrow Lu, and the combustion gas is discharged into the exhaust gas pipe 120.

The reformer 40 and the evaporator 42 are provided in the second area R2, and the heat exchanger 44 is provided in the third area R3. In the structure, the combustion gas discharged from the first area R1 firstly heats the reformer 40, secondly heats the evaporator 42, and then heats the heat exchanger 44.

In the first embodiment, the evaporator 42 includes the annular water supply chamber 98a and the annular water vapor discharge chamber 98b. The water is supplied to the water supply chamber 98a, and the water vapor is discharged into the water vapor discharge chamber 98b. Further, the evaporator 42 includes the plurality of evaporation pipes 90 and the combustion gas channel 80. One end of each of the evaporation pipes 90 is connected to the water supply chamber 98a, and the other end thereof is connected to the water vapor discharge chamber 98b. The combustion gas is supplied through the combustion gas channel 80 into the spaces between the evaporation pipes 90.

Thus, simple structure is achieved easily. Accordingly, the production cost is reduced as a whole effectively. Further, by changing the volumes of the water supply chamber 98*a* and the water vapor discharge chamber 98*b*, and the length, the diameter, and the number of the evaporation pipes 90, a desired operation can be achieved depending on various operating conditions, and a degree of freedom of design for the fuel cell module can be enhanced.

Further, at least one of the evaporation pipes 90 connects the water vapor discharge chamber 98*b* to the inlet of the reformer 40 to form the evaporation return pipe 106 as a passage of the water vapor. Thus, in a state where the water vapor is maintained at high temperature, the water vapor is mixed with the raw fuel to obtain the mixed gas. Accordingly, improvement in the reforming efficiency is achieved.

Further, the raw fuel pipe 107 is inserted into the evaporation return pipe 106 such that the raw fuel flows from the downstream side to the upstream side of the evaporation return pipe 106. In the structure, the raw fuel and the water vapor flow in a counterflow manner. Therefore, size reduction of the peripheral equipment is achieved as a whole, and improvement in the heat efficiency is achieved by suppressing heat dissipation.

Further, as shown in FIG. 3, the reformer 40 includes the annular mixed gas supply chamber 94*a* and the annular fuel gas discharge chamber 94*b*. The mixed gas is supplied to the mixed gas supply chamber 94*a*, and the produced fuel gas is discharged into the annular fuel gas discharge chamber 94*b*. Further, the reformer 40 includes the plurality of reforming pipes 82 and the combustion gas channel 80. One end of each of the reforming pipes 82 is connected to the mixed gas supply chamber 94*a*, and the other end thereof is connected to the fuel gas discharge chamber 94*b*. The combustion gas is supplied through the combustion gas channel 80 into the spaces between the reforming pipes 82.

As described above, the annular mixed gas supply chamber 94*a*, the annular fuel gas discharge chamber 94*b*, and the reforming pipes 82 are provided as basic structure. Thus, simple structure is achieved easily. Accordingly, the production cost of the fuel cell module 12 is reduced as a whole effectively. Further, by changing the volumes of the mixed gas supply chamber 94*a* and the fuel gas discharge chamber 94*b*, the length, the diameter, and the number of the reforming pipes 82, a desired operation can be achieved depending on various operating conditions, and a degree of freedom of design for the fuel cell module can be enhanced.

Further, the heat exchanger 44 includes the annular oxygen-containing gas supply chamber 114*a* and the annular oxygen-containing gas discharge chamber 114*b*. The oxygen-containing gas is supplied to the oxygen-containing gas supply chamber 114*a*, and the heated oxygen-containing gas is discharged into the oxygen-containing gas discharge chamber 114*b*. Further, the heat exchanger 44 includes the plurality of heat exchange pipes 108 and the combustion gas channel 80. One end of each of the heat exchange pipes 108 is connected to the oxygen-containing gas supply chamber 114*a*, and the other end thereof is connected to the oxygen-containing gas discharge chamber 114*b*. The combustion gas is supplied through the combustion gas channel 80 into the spaces between the heat exchange pipes 108.

As described above, the annular oxygen-containing gas supply chamber 114*a*, the annular oxygen-containing gas discharge chamber 114*b*, and the heat exchange pipes 108 are provided as basic structure. Thus, simple structure is achieved easily. Accordingly, the production cost of the fuel cell module 12 is reduced as a whole effectively. Further, by changing the volumes of the oxygen-containing gas supply chamber 114*a* and the oxygen-containing gas discharge chamber 114*b*, the length, the diameter, and the number of the heat exchange pipes 108, a desired operation can be achieved depending on various operating conditions, and a degree of freedom of design for the fuel cell module can be increased.

Further, the fuel gas discharge chamber 94*b*, the water vapor discharge chamber 98*b*, and the oxygen-containing gas discharge chamber 114*b* are provided at one end adjacent to the fuel cell stack 24, and the mixed gas supply chamber 94*a*, the water supply chamber 98*a*, and the oxygen-containing gas supply chamber 114*a* are provided at the opposite end remote from the fuel cell stack 24.

In the structure, it becomes possible to rapidly supply the heated reactant gasses (fuel gas and oxygen-containing gas) immediately after reforming, to the fuel cell stack 24. Further, it is possible to supply the exhaust gas from the fuel cell stack 24, to the exhaust gas combustor 46, the reformer 40, the evaporator 42, and the heat exchanger 44 of the FC peripheral equipment 38 while minimizing the decrease in the temperature due to heat dissipation. Accordingly, improvement in the heat efficiency is achieved, and thermally self-sustaining operation is facilitated. The thermally self-sustaining operation herein means operation where the temperature of the fuel cells is maintained at the operating temperature using only heat energy generated by the fuel cell stack 24 itself, without supplying additional heat from the outside.

Further, the fuel cell module 12 is a solid oxide fuel cell module. Therefore, the fuel cell module 12 is optimally applicable to high temperature type fuel cells such as SOFC.

Figure 10:
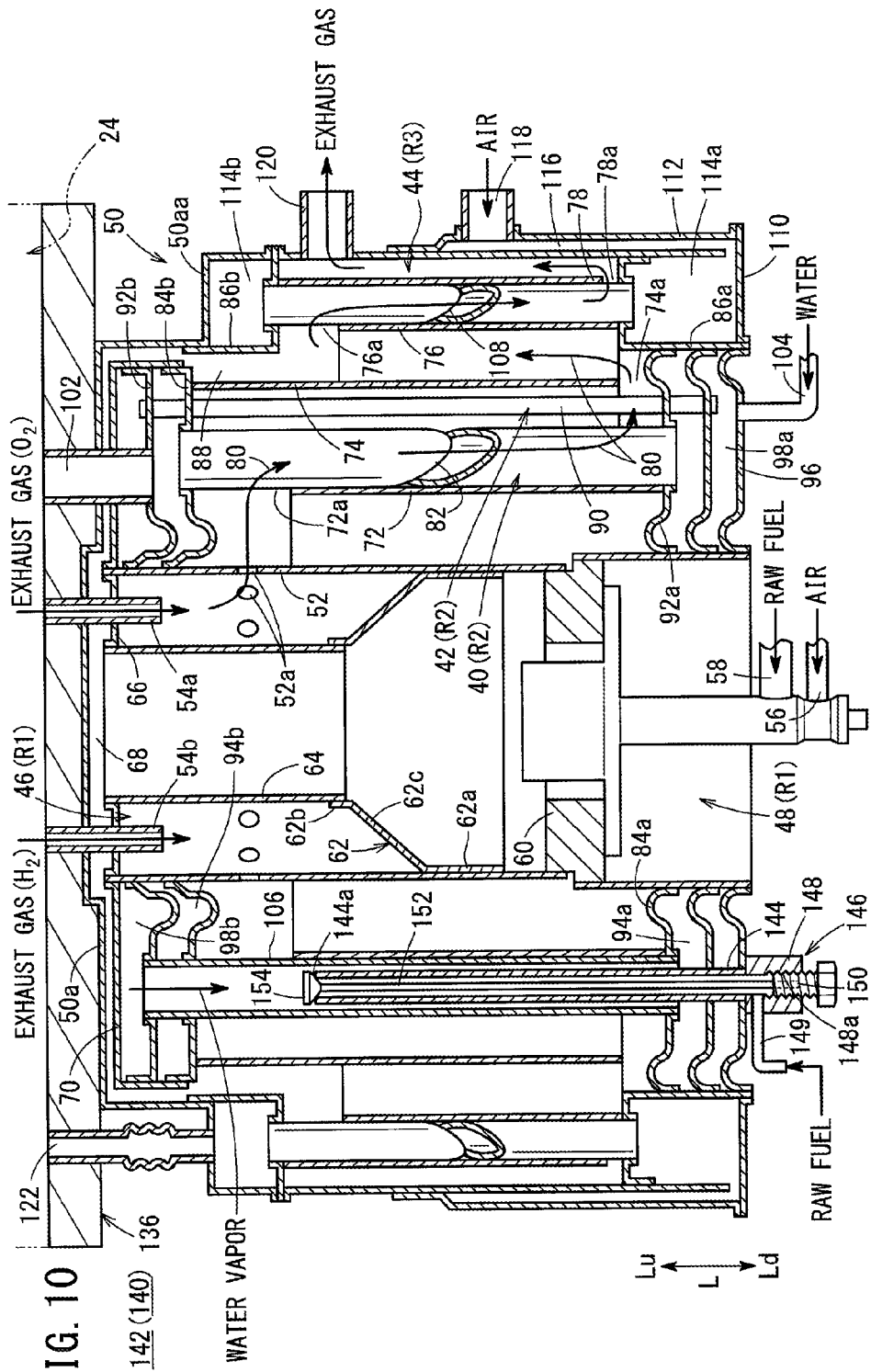
FIG. 10 is a cross sectional view showing FC peripheral equipment of a fuel cell module according to a second embodiment of the present invention.
Figure 11:
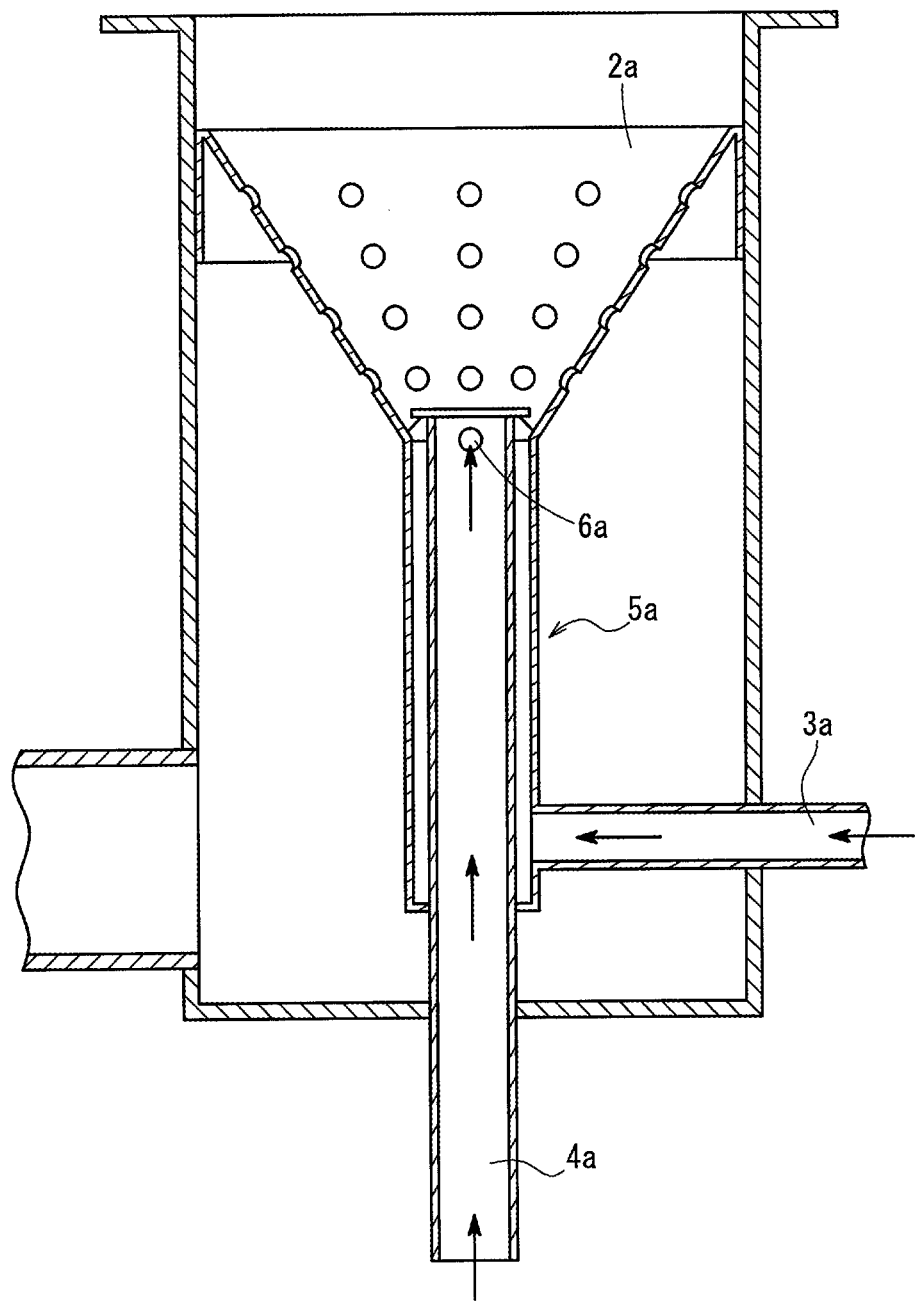
FIG. 11 is a view schematically showing a combustion apparatus for a fuel cell system disclosed in a conventional technique 1.
Figure 12:
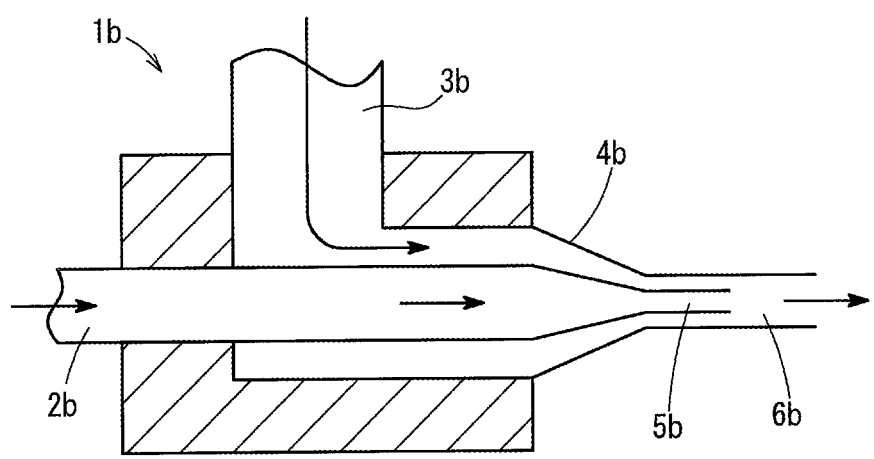
FIG. 12 is a view schematically showing a vaporizer disclosed in a conventional technique 2.
Figure 13:
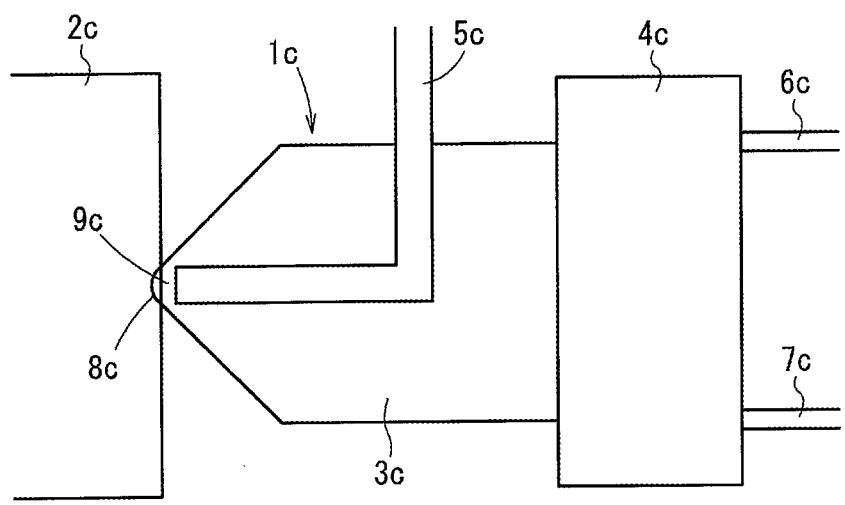
FIG. 13 is a view schematically showing an injection device disclosed in a conventional technique 3.

FIG. 10 is a cross sectional view showing FC peripheral equipment 142 of a fuel cell module 140 according to a second embodiment of the present invention. The constituent elements that are identical to those of the fuel cell module 12 according to the first embodiment are labeled with the same reference numerals and description thereof will be omitted.

In the FC peripheral equipment 142, a raw fuel pipe 144 is inserted into an evaporation return pipe 106 for allowing the raw fuel to flow from the downstream side to the upstream side of the evaporation return pipe 106. The raw fuel pipe 144 has a raw fuel supply port 144*a* connecting the inside of the raw fuel pipe 144 and the inside of the evaporation return pipe 106. Further, the raw fuel pipe 144 includes an opening size adjustment portion 146 for adjusting the opening cross sectional area of the raw fuel supply port 144*a*.

The raw fuel pipe 144 extends through the evaporation return pipe 106 to a position adjacent to the water vapor discharge chamber 98*b*. The raw fuel supply port 144*a* is opened at the front end of the raw fuel pipe 144. The raw fuel pipe 144 has a cylindrical shape.

The raw fuel, which flows through the raw fuel pipe 144 in the direction indicated by an arrow Lu, and the water vapor, which flows through the evaporation return pipe 106 in a direction indicated by an arrow Ld, flow in a counterflow manner. The raw fuel is mixed into the water vapor through the raw fuel supply port 144*a* using Venturi effect.

The opening size adjustment portion 146 includes a female screw member 148 fixed to a lower end of the raw fuel pipe 144. A female screw 148*a* is formed inside the female screw member 148, and a pipe 149 for supplying the raw fuel is connected to the female screw member 148. An adjustment screw 150 as a male screw is screwed into the female screw member 148a.

One end of an elongated rod 152 is fixed to the adjustment screw 150. The rod 152 is inserted into a raw fuel pipe 144, and the other end of the rod 152 is exposed to the outside of the raw fuel pipe 144, and has a valve member 154. The valve member 154 has a conical shape having a substantially triangular cross section, and the valve member 154 is capable of adjusting the opening degree of the raw fuel supply port 144a depending on the relative position with the front end of the raw fuel pipe 144.

In the structure, in the second embodiment, the same advantages as in the case of the first embodiment are obtained. Moreover, in particular, it becomes possible to easily adjust the amount of the supplied raw fuel. Accordingly, the reforming process is suitably performed advantageously.

The invention claimed is:

1. A fuel cell module comprising:
a fuel cell stack formed by stacking a plurality of fuel cells for generating electricity by electrochemical reactions of a fuel gas and an oxygen-containing gas;
a reformer for reforming a mixed gas of a raw fuel containing hydrocarbon and water vapor to produce the fuel gas supplied to the fuel cell stack;
an evaporator for evaporating water, and supplying the water vapor to the reformer;
a heat exchanger for raising a temperature of the oxygen-containing gas by heat exchange with a combustion gas, and supplying the oxygen-containing gas to the fuel cell stack;
an exhaust gas combustor for combusting the fuel gas discharged from the fuel cell stack as a fuel exhaust gas and the oxygen-containing gas discharged from the fuel cell stack as an oxygen-containing exhaust gas to produce the combustion gas; and
a start-up combustor for combusting the raw fuel and the oxygen-containing gas to produce the combustion gas,
wherein the evaporator includes an annular water supply chamber to which the water is supplied, an annular water vapor discharge chamber to which the water vapor is discharged, a plurality of evaporation pipes each having one end connected to the water supply chamber and another end connected to the water vapor discharge chamber, and a combustion gas channel for supplying the combustion gas between the evaporation pipes; and
at least one of the evaporation pipes connects the water vapor discharge chamber and an inlet of the reformer to form an evaporation return pipe as a passage of the water vapor; and
a raw fuel pipe is inserted into the evaporation return pipe for allowing the raw fuel to flow from a downstream side to an upstream side of the evaporation return pipe.

2. The fuel cell module according to claim 1, wherein the raw fuel pipe has a raw fuel supply port connecting the inside of the raw fuel pipe and the inside of the evaporation return pipe.

3. The fuel cell module according to claim 2, wherein the raw fuel pipe extends through the evaporation return pipe to a position adjacent to the water vapor discharge chamber; and
the raw fuel supply port is opened at a position adjacent to the water vapor discharge chamber.

4. The fuel cell module according to claim 2, wherein an opening size adjustment portion is provided for adjusting an opening cross sectional area of the raw fuel supply port.

5. The fuel cell module according to claim 1, wherein the reformer includes an annular mixed gas supply chamber to which the mixed gas is supplied, an annular fuel gas discharge chamber to which the produced fuel gas is discharged, a plurality of reforming pipes each having one end connected to the mixed gas supply chamber and another end connected to the fuel gas discharge chamber, and a combustion gas channel for supplying the combustion gas between the reforming pipes.

6. The fuel cell module according to claim 5, wherein the heat exchanger includes an annular oxygen-containing gas supply chamber to which the oxygen-containing gas is supplied, an annular oxygen-containing gas discharge chamber to which the heated oxygen-containing gas is discharged, a plurality of heat exchange pipes each having one end connected to the oxygen-containing gas supply chamber and another end connected to the oxygen-containing gas discharge chamber, and a combustion gas channel for supplying the combustion gas between the heat exchange pipes.

7. The fuel cell module according to claim 6, wherein the fuel gas discharge chamber, the water vapor discharge chamber, and the oxygen-containing gas discharge chamber are provided at one end adjacent to the fuel cell stack; and
the mixed gas supply chamber, the water supply chamber, and the oxygen-containing gas supply chamber are provided at the opposite end remote from the fuel cell stack.

8. The fuel cell module according to claim 1, wherein the fuel cell module is a solid oxide fuel cell module.

* * * * *